United States Patent
Kim et al.

(10) Patent No.: US 12,022,447 B2
(45) Date of Patent: Jun. 25, 2024

(54) METHOD AND DEVICE FOR TRANSMISSION/RECEPTION BASED ON TIME UNIT GROUP IN WIRELESS COMMUNICATION SYSTEM

(71) Applicant: LG ELECTRONICS INC., Seoul (KR)

(72) Inventors: Seonwook Kim, Seoul (KR); Inkwon Seo, Seoul (KR); Suckchel Yang, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/225,019

(22) Filed: Jul. 21, 2023

(65) Prior Publication Data

US 2023/0362901 A1    Nov. 9, 2023

Related U.S. Application Data

(63) Continuation of application No. 18/083,951, filed on Dec. 19, 2022, now Pat. No. 11,758,526, which is a (Continued)

(30) Foreign Application Priority Data

Aug. 5, 2020 (KR) .................. 10-2020-0098204

(51) Int. Cl.
*H04W 72/0446* (2023.01)
*H04L 27/26* (2006.01)
(Continued)

(52) U.S. Cl.
CPC ... *H04W 72/0446* (2013.01); *H04L 27/26025* (2021.01); *H04W 24/08* (2013.01); *H04W 72/23* (2023.01)

(58) Field of Classification Search
CPC . H04W 72/0446; H04W 72/23; H04W 24/08; H04L 27/26025
See application file for complete search history.

(56) References Cited

FOREIGN PATENT DOCUMENTS

| KR | 2020-0088305 A | * | 7/2020 | |
|----|----|----|----|----|
| WO | WO-2022155243 A1 | * | 7/2022 | ....... H04L 27/26025 |

(Continued)

OTHER PUBLICATIONS

Ericsson, R1-2000230, 'Remaining issue of PDCCH Enhancements for NR URLLC', Feb. 24-Mar. 6, 2020, pp. 1-26. (Year: 2020).*

(Continued)

*Primary Examiner* — Melvin C Marcelo
(74) *Attorney, Agent, or Firm* — BRYAN CAVE LEIGHTON PAISNER LLP

(57) ABSTRACT

Disclosed are a method and a device for performing transmission/reception on the basis of a time unit group in a wireless communication system. According to one embodiment of the present disclosure, a method by which a terminal receives a downlink channel in a wireless communication system comprises the steps of: receiving configuration information about a slot group; monitoring a downlink control channel in one or more search space (SS) sets on the basis of the slot group; and receiving downlink control information (DCI) in the downlink control channel, wherein one or more from among the period, the offset and the duration of the SS sets can be set on the basis of granularity M (M is an integer greater than 1) of the slot group.

11 Claims, 11 Drawing Sheets

Related U.S. Application Data continuation of application No. PCT/KR2021/010036, filed on Aug. 2, 2021.

(51) Int. Cl.
  *H04W 24/08* (2009.01)
  *H04W 72/23* (2023.01)

(56) References Cited

FOREIGN PATENT DOCUMENTS

| | | |
|---|---|---|
| WO | WO-2022212688 A1 * | 10/2022 |
| WO | WO-2022216603 A1 * | 10/2022 |

OTHER PUBLICATIONS

R1-1912486, 3GPP TSG RAN WG1, #99, Reno, USA, Nov. 18-22, 2019, Agenda item: 7.2.9.1, Source: Samsung, 'Remaining issue for PDCCH-based power saving signal/channel', 8 pages. (Year: 2019).*
R1-1913494, 3GPP TSG RAN WG1, Meeting #99, Reno , USA, Nov. 18-22, 2019, 'Summary of PDCCH-based Power Saving Signal/Channel', Agenda item: 7.2.9.1, Source: CATT, 41 pages. (Year: 2019).*
R1-19131111, 3GPP TSG RAN WG1 #99, Reno, Nevada, USA, Nov. 18-22, 2019, Agenda item: 7.2.9.1, Source: Nokia, Nokia Shanghai Bell, On PDCCH-based power saving techniques, 13 pages. (Year: 2019).*
R2-2005627, 3GPP TSG-RAN WG2, Meeting #110, electronic, Jun. 1-Jun. 12, 2020, Source: Huawei, HiSilicon, '[H242]Correction to DCI formats in Search Space', Agenda item: 6.0.3, 9 pages. (Year: 2020).*

* cited by examiner

METHOD AND DEVICE FOR TRANSMISSION/RECEPTION BASED ON TIME UNIT GROUP IN WIRELESS COMMUNICATION SYSTEM

CROSS-REFERENCE TO RELATED APPLICATIONS

This application is a is a Continuation Application of U.S. patent application Ser. No. 18/083,951, filed on Dec. 19, 2022, which is a Continuation Application of International Application No. PCT/KR2021/010036, filed on Aug. 2, 2021, which claims priority of Korean Application No. 10-2020-0098204, filed on Aug. 5, 2020, the contents of which are all hereby incorporated by reference herein in their entirety.

TECHNICAL FIELD

The present disclosure relates to a wireless communication system, and more particularly, to a method and an apparatus for performing transmission/reception based on a group of time units in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and apparatus for transmitting/receiving based on a group of time units in a wireless communication system.

An additional technical object of the present disclosure is to provide a method and apparatus for transmitting a downlink control channel at a transmitting end and monitoring and receiving a downlink control channel at a receiving end based on a group of time units in a wireless communication system.

An additional technical object of the present disclosure is to provide a method and apparatus for transmitting/receiving a downlink control channel based on a search space set-related configuration based on a group of time units in a wireless communication system.

An additional technical object of the present disclosure is to provide a method and apparatus for performing uplink/downlink transmission/reception based on timing related to a downlink control channel based on a group of time units in a wireless communication system.

The technical objects to be achieved by the present disclosure are not limited to the above-described technical objects, and other technical objects which are not described herein will be clearly understood by those skilled in the pertinent art from the following description.

According to an aspect of the present disclosure, a method of receiving a downlink channel by terminal in a wireless communication system may comprise: receiving configuration information for a slot group; monitoring a downlink control channel in at least one search space (SS) set, based on the slot group; and receiving downlink control information (DCI) in the downlink control channel, wherein at least one of a period, offset, or duration of the SS set is configured based on a granularity M (where M is an integer greater than 1) of the slot group.

According to another aspect of the present disclosure, a method of transmitting a downlink channel by a base station in a wireless communication system may comprise: transmitting to a terminal configuration information for a slot group; and transmitting a downlink control channel including downlink control information (DCI) in at least one search space (SS) set, based on the slot group, wherein at least one of a period, offset, or duration of the SS set is configured based on a granularity M (where M is an integer greater than 1) of the slot group.

According to an embodiment of the present disclosure, a method and apparatus for transmitting/receiving based on a group of time units in a wireless communication system may be provided.

According to an embodiment of the present disclosure, a method and apparatus for transmitting a downlink control channel at a transmitting end and monitoring and receiving a downlink control channel at a receiving end based on a group of time units in a wireless communication system may be provided.

According to an embodiment of the present disclosure, a method and apparatus for transmitting/receiving a downlink control channel based on a search space set-related configuration based on a group of time units in a wireless communication system may be provided.

According to an embodiment of the present disclosure, a method and apparatus for performing uplink/downlink transmission/reception based on timing related to a downlink control channel based on a group of time units in a wireless communication system may be provided.

Effects achievable by the present disclosure are not limited to the above-described effects, and other effects which are not described herein may be clearly understood by those skilled in the pertinent art from the following description.

BRIEF DESCRIPTION OF DRAWINGS

Accompanying drawings included as part of detailed description for understanding the present disclosure provide embodiments of the present disclosure and describe technical features of the present disclosure with detailed description.

DETAILED DESCRIPTION

Figure 1:
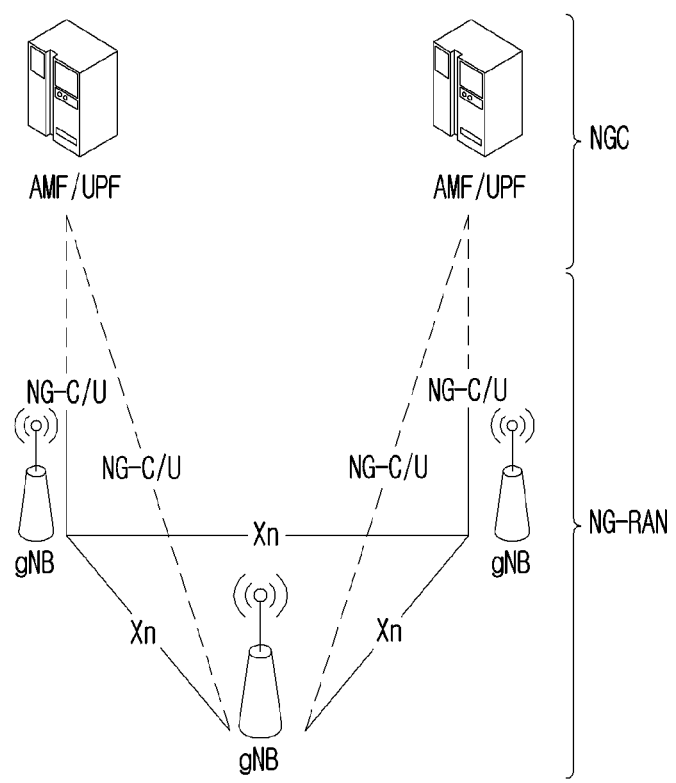
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI Channel Quality Indicator
CRI channel state information—reference signal resource indicator
CSI channel state information
CSI-IM channel state information—interference measurement
CSI-RS channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
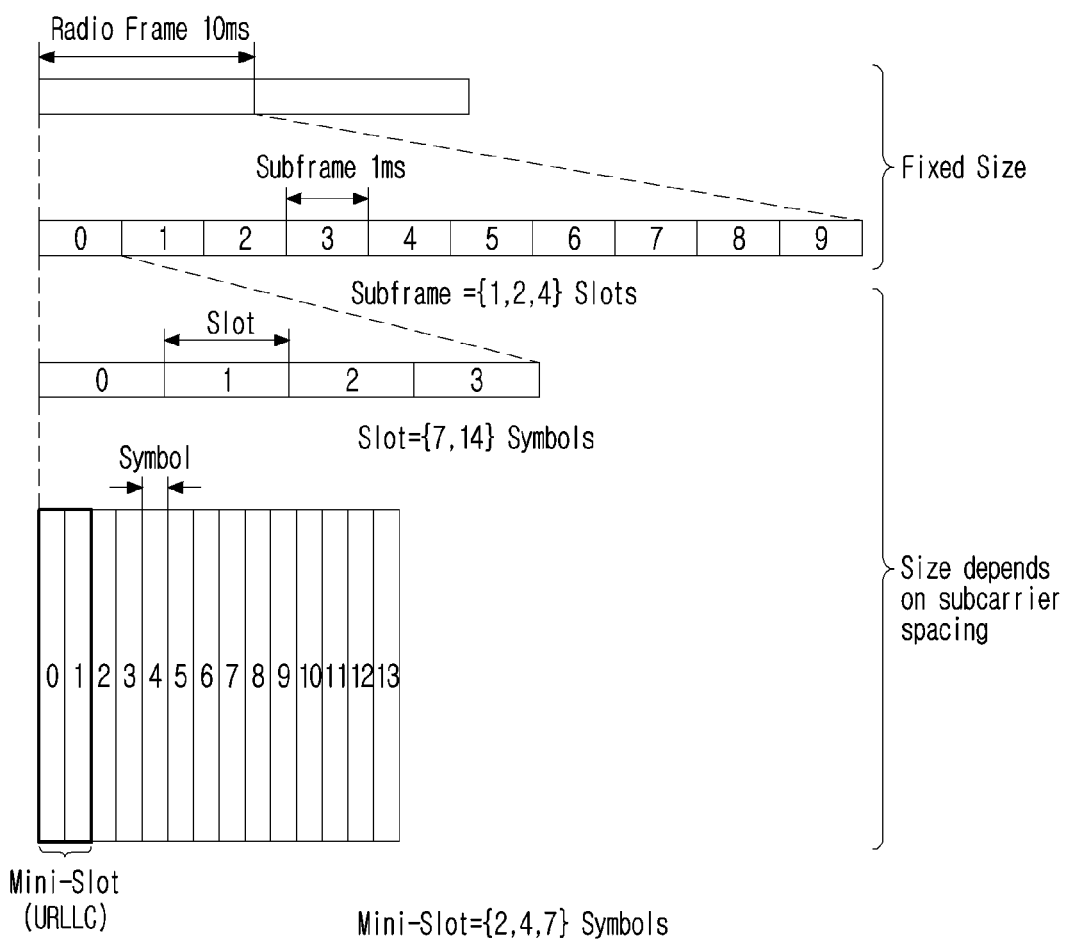
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^μ$ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$) the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

TABLE 3-continued

| μ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
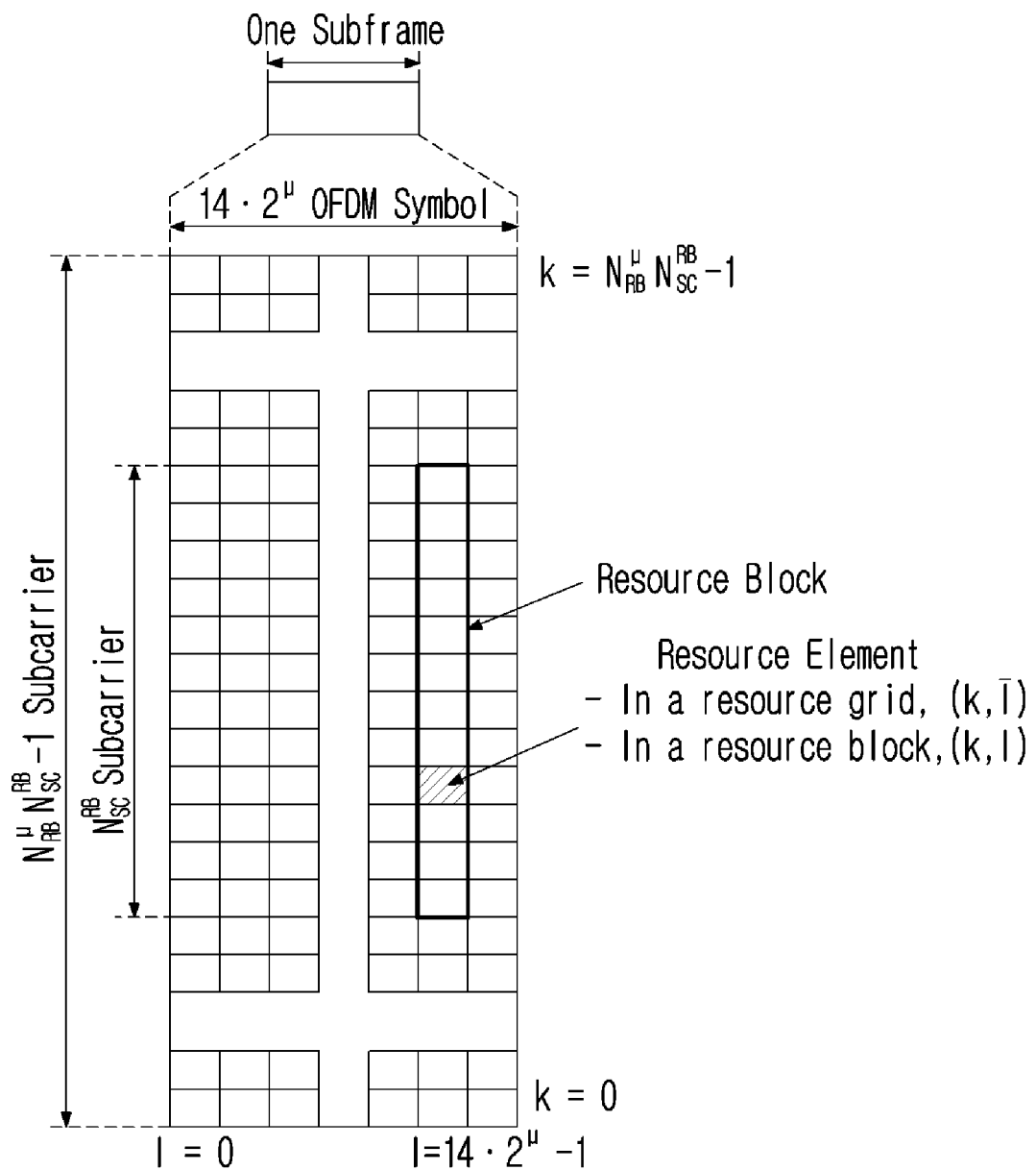
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, ..., $N_{RB}^\mu N_{sc}^{RB}-1$ is an index in a frequency domain and l'=0, ..., $2^\mu N_{symb}^{(\mu)}-1$ refers to a position of a symbol in a subframe. When referring to a resource element in a slot, an index pair (k,l) is used. Here, l=0, ..., $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
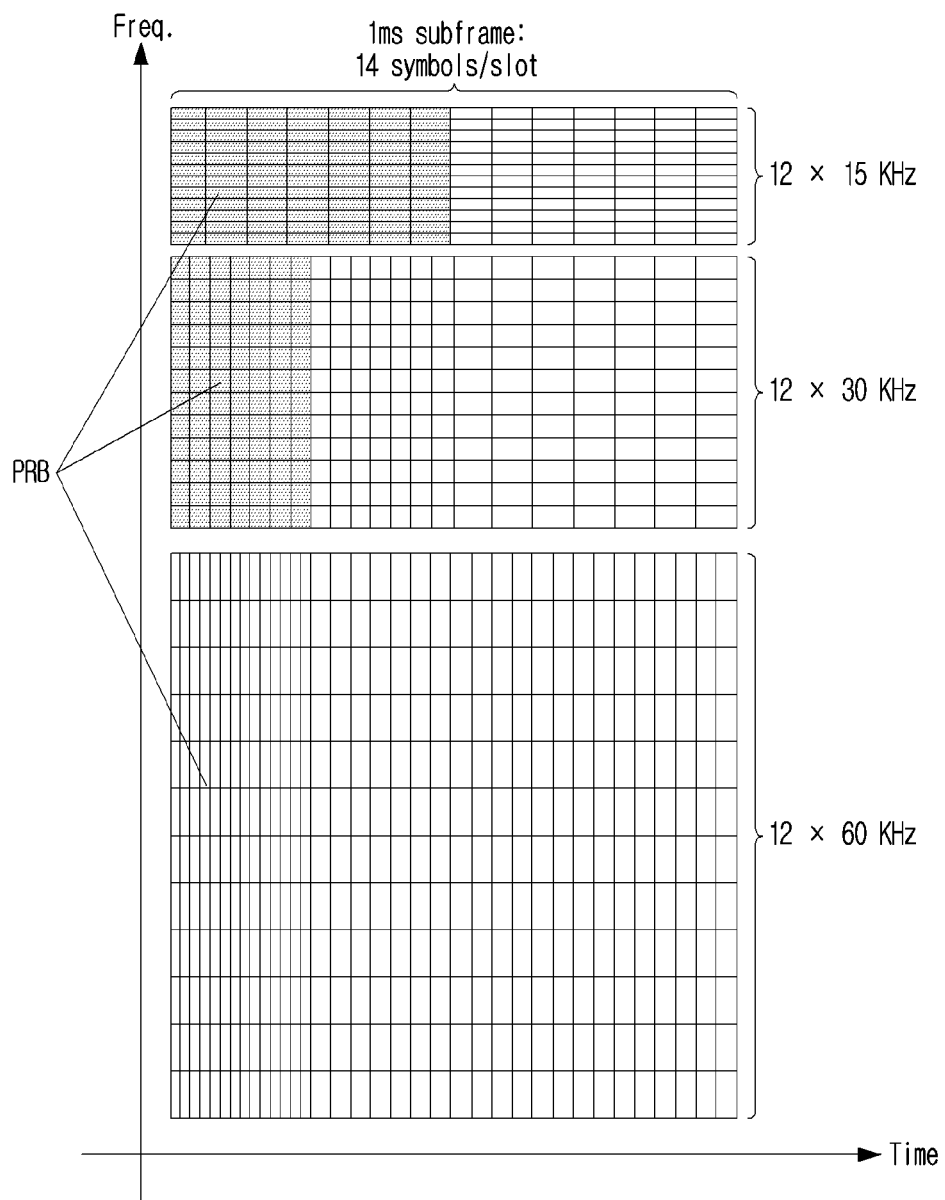
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
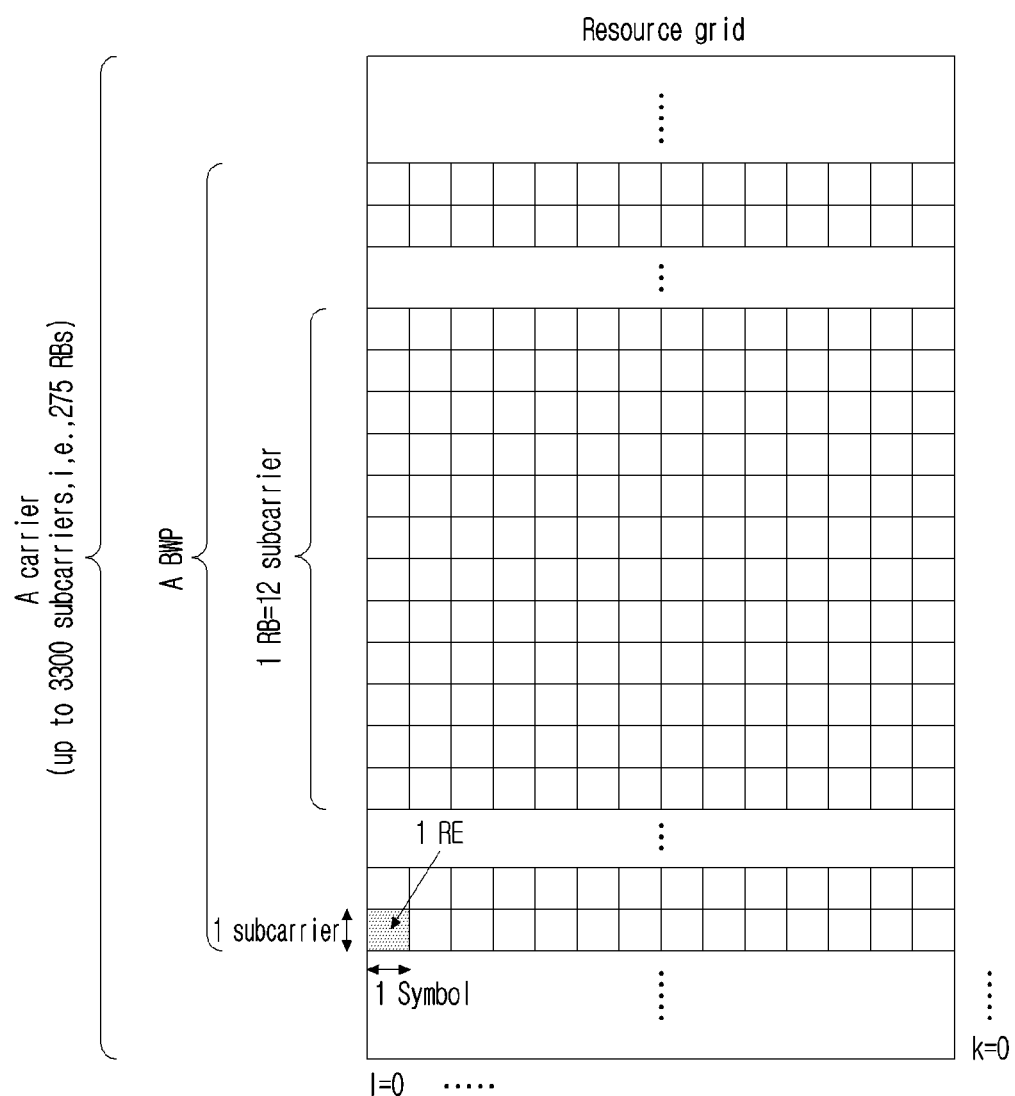
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
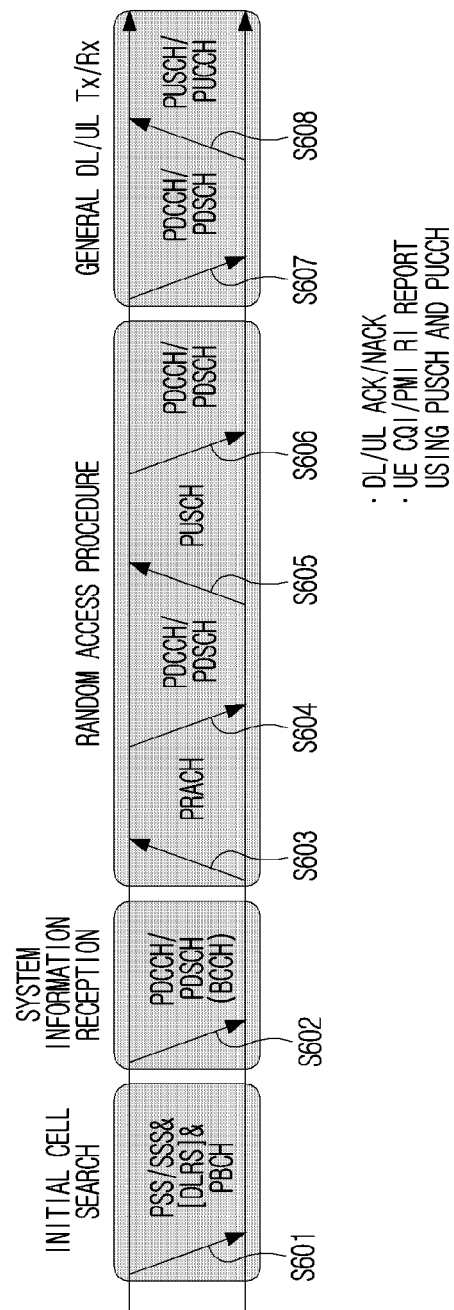
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs)(or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/ indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/ mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/ indicated to a terminal through higher layer signaling (e.g., RRC signaling)/L2 signaling (e.g., MAC-CE)/L1 signaling (e.g., DCI), etc. In an example, it may be configured/ indicated so that PDCCH detection will be performed per each TRP/panel in a unit of a corresponding CORESET group (i.e., per TRP/panel belonging to the same CORESET group). Additionally/alternatively, it may be configured/ indicated so that uplink control information (e.g., CSI, HARQ-A/N (ACK/NACK), SR (scheduling request)) and/ or uplink physical channel resources (e.g., PUCCH/ PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
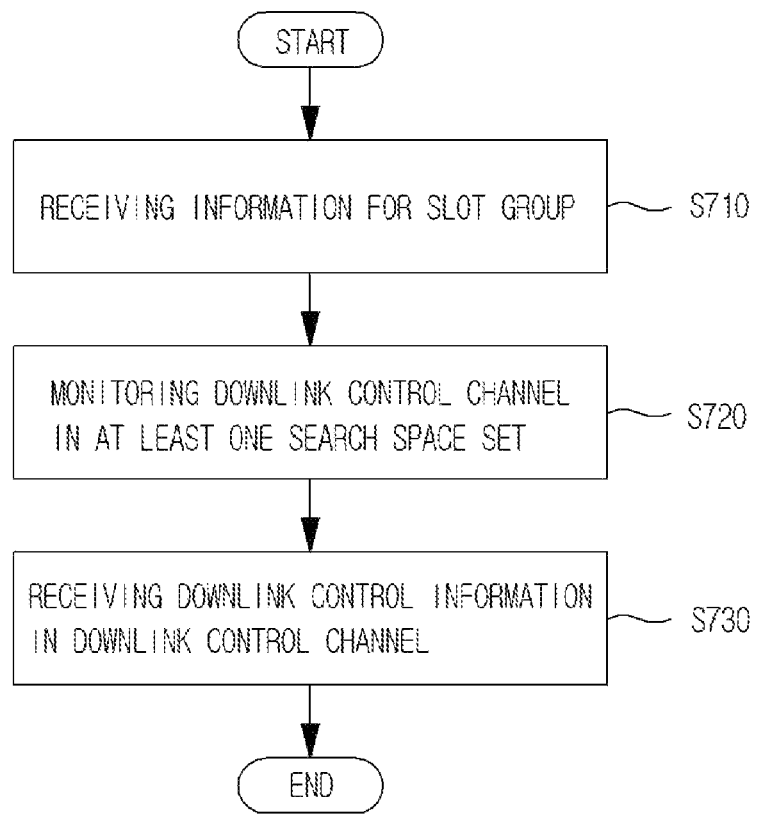
FIG. 7 is a diagram for explaining a method of transmitting or receiving by a terminal based on a group of time units according to an embodiment of the present disclosure.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following method is discussed.

1) Method 1 (SDM): Time and Frequency Resource Allocation is Overlapped and n (n<=Ns) TCI States in a Single Slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule.

1-b) Method 1b

The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

At one transmission time (occasion), the same TB having one DMRS port associated with multiple TCI state indexes is transmitted in one layer or the same TB having multiple DMRS ports one-to-one associated with multiple TCI state indexes is transmitted in one layer.

In case of the method 1a and 1c, the same MCS is applied to all layers or all layer sets.

2) Method 2 (FDM): Frequency Resource Allocation is not Overlapped and n (n<=ND TCI States in a Single Slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the method 2a, the same MCS is applied to all non-overlapping frequency resource allocation.

3) Method 3 (TDM): Time Resource Allocation is not Overlapped and n (n<=Nt1) TCI States in a Single Slot Each transmission time (occasion) of a TB has time granularity of a mini-slot and has one TCI and one RV.

A common MCS is used with a single or multiple DMRS port(s) at every transmission time (occasion) in a slot.

A RV/TCI may be the same or different at a different transmission time (occasion).

4) Method 4 (TDM): n (n<=Nt2) TCI States in K (n<=K) Different Slots

Each transmission time (occasion) of a TB has one TCI and one RV.

Every transmission time (occasion) across K slots uses a common MCS with a single or multiple DMRS port(s).

A RV/TCI may be the same or different at a different transmission time (occasion).

Hereinafter, MTRP URLLC is described.

In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 to share received data/DCI through a backhaul link connected between TRPs. UE configured with a UL MTRP-URLLC transmission method transmits the same data/UCI by using a different layer/time/frequency resource. In this case, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and may configure spatial relation information, etc. to UE through other parameter, instead of a TCI state. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurements per cell), l: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, UE may figure out whether of MTRP URLLC transmission/reception or MTRP eMBB transmission/reception by separately dividing a RNTI for MTRP-URLLC and a RNTI for MTRP-eMBB and using them. In other words, when CRC masking of DCI is performed by using a RNTI for URLLC, UE considers it as URLLC transmission and when CRC masking of DCI is performed by using a RNTI for eMBB, UE considers it as eMBB transmission. Alternatively, a base station may configure MTRP URLLC transmission/reception or TRP eMBB transmission/reception to UE through other new signaling.

In a description of the present disclosure, it is described by assuming cooperative transmission/reception between 2 TRPs for convenience of a description, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.

Hereinafter, methods proposed in the present disclosure may be utilized in a situation that MTRPs cooperatively transmit a PDCCH (repetitively transmit or partitively transmit the same PDCCH). In addition, methods proposed in the present disclosure may be also utilized in a situation that MTRPs cooperatively transmit a PDSCH or cooperatively receive a PUSCH/a PUCCH.

In addition, in the present disclosure, when a plurality of base stations (i.e., MTRPs) repetitively transmit the same PDCCH, it may mean the same DCI is transmitted through multiple PDCCH candidates and it may also mean that a plurality of base stations repetitively transmit the same DCI. Here, the same DCI may mean two DCI with the same DCI format/size/payload. Alternatively, although two DCI has a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception occasion of DCI, so if DCI received at n occasions and DCI received at n+1 occasions inform UE of the same scheduling result, a TDRA field of two DCI is different and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of the other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRPs) partitively transmit the same PDCCH, it means that one DCI is transmitted through one PDCCH candidate, but TRP 1 transmits some resources that such a PDCCH candidate is defined and TRP 2 transmits the remaining resources. For example, when a PDCCH candidate corresponding to aggregation level m1+m2 is partitively transmitted by TRP 1 and TRP 2, a PDCCH candidate may be divided into PDCCH candidate 1 corresponding to aggregation level m1 and PDCCH candidate 2 corresponding to aggregation level m2, and TRP 1 may transmit PDCCH candidate 1 and TRP 2 may transmit PDCCH candidate 2 to a different time/frequency resource. After receiving PDCCH candidate 1 and PDCCH candidate 2, UE may generate a PDCCH candidate corresponding to aggregation level m1+m2 and try DCI decoding.

In addition, in the present disclosure, when UE repetitively transmits the same PUSCH so that a plurality of base stations (i.e., MTRPs) can receive it, it may mean that UE transmitted the same data through multiple PUSCHs. In this case, each PUSCH may be optimized and transmitted to an UL channel of a different TRP. For example, when UE repetitively transmits the same data through PUSCH 1 and 2, PUSCH 1 is transmitted by using UL TCI state 1 for TRP 1 and in this case, link adaptation such as a precoder/MCS, etc. may be also scheduled/applied to a value optimized for a channel of TRP 1. PUSCH 2 is transmitted by using UL TCI state 2 for TRP 2 and link adaptation such as a precoder/MCS, etc. may be also scheduled/applied to a value optimized for a channel of TRP 2. In this case, PUSCH 1 and 2 which are repetitively transmitted may be transmitted at a different time to be TDM, FDM or SDM.

In addition, in the present disclosure, when UE partitively transmits the same PUSCH so that a plurality of base stations (i.e., MTRPs) can receive it, it may mean that UE transmits one data through one PUSCH, but it divides resources allocated to that PUSCH, optimizes them for an UL channel of a different TRP and transmits them. For example, when UE transmits the same data through 10 symbol PUSCHs, data is transmitted by using UL TCI state 1 for TRP 1 in 5 previous symbols and in this case, link adaptation such as a precoder/MCS, etc. may be also scheduled/applied to a value optimized for a channel of TRP 1. The remaining data is transmitted by using UL TCI state 2 for TRP 2 in the remaining 5 symbols and in this case, link adaptation such as a precoder/MCS, etc. may be also scheduled/applied to a value optimized for a channel of TRP 2. In the example, transmission for TRP 1 and transmission for TRP 2 are TDM-ed by dividing one PUSCH into time resources, but it may be transmitted by a FDM/SDM method.

In addition, similarly to the above-described PUSCH transmission, also for a PUCCH, UE may repetitively transmit the same PUCCH or may partitively transmit the same PUCCH so that a plurality of base stations (i.e., MTRPs) receive it.

Hereinafter, a proposal of the present disclosure may be extended and applied to a variety of channels such as a PUSCH/a PUCCH/a PDSCH/a PDCCH, etc.

A proposal of the present disclosure may be extended and applied to both a case in which various uplink/downlink channels are repetitively transmitted to a different time/frequency/space resource and a case in which various uplink/downlink channels are partitively transmitted to a different time/frequency/space resource.

Control Resource Set (CORESET)

A predetermined resource used for monitoring a downlink control channel (e.g., a PDCCH) may be defined based on a control channel element (CCE), a resource element group (REG) and a control resource set (CORESET). In addition, the predetermined resource may be defined as a resource which is not used for a DMRS associated with a downlink control channel.

A CORESET corresponds to a time-frequency resource which tries decoding of a control channel candidate by using one or more search spaces (SS). For example, a CORESET is defined as a resource that a terminal may receive a PDCCH and a base station does not necessarily transmit a PDCCH in a CORESET.

In a time-frequency domain, a size and a position of a CORESET may be configured semi-statically by a network. In a time domain, a CORESET may be positioned in any symbol in a slot. For example, a time length of a CORESET may be defined as up to 2 or 3 symbol durations. In a frequency domain, a CORESET may be positioned at a position of any frequency in an active bandwidth part (BWP) within a carrier bandwidth. A frequency size of a CORESET may be defined as a multiple of 6 RB units in a carrier bandwidth (e.g., 400 MHz) or less. A time-frequency position and size of a CORESET may be configured by RRC signaling.

A first CORESET (or CORESET 0) may be configured by a master information block (MIB) provided through a PBCH. A MIB may be obtained by a terminal from a network at an initial access step and a terminal may monitor a PDCCH including information scheduling system information block1 (SIB1) in CORESET 0 configured by a MIB. After a terminal is configured for connection, one or more CORESETs may be additionally configured through RRC signaling. An identifier may be allocated to each of a plurality of CORESETs. A plurality of CORESETs may be overlapped each other.

A PDSCH in a slot may be also positioned before starting or after ending a PDCCH in a CORESET. In addition, an unused CORESET resource may be reused for a PDSCH. For it, a reserved resource is defined, which may be overlapped with a CORESET. For example, one or more reserved resource candidates may be configured and each of reserved resource candidates may be configured by a bitmap in a time resource unit and a bitmap in a frequency resource unit. Whether a configured reserved resource candidate is activated (or whether it may be used for a PDSCH) may be dynamically indicated or may be semi-statically configured through DCI.

One CCE-to-REG mapping relationship may be defined for each CORESET. Here, one REG is a unit corresponding to one OFDM symbol and one RB (i.e., 12 subcarriers). One CCE may correspond to 6 REGs. A CCE-to-REG mapping relationship of a different CORESET may be the same or may be configured differently. A mapping relationship may be defined in a unit of a REG bundle. A REG bundle may correspond to a set of REG(s) that a terminal assumes consistent precoding will be applied. CCE-to-REG mapping may include or may not include interleaving. For example, when interleaving is not applied, a REG bundle configured with 6 consecutive REGs may form one CCE. When interleaving is applied, a size of a REG bundle may be 2 or 6 when a time duration length of a CORESET is 1 or 2 OFDM symbols and a size of a REG bundle may be 3 or 6 when a time duration length of a CORESET is 3 OFDM symbols. A block interleaver may be applied so that a different REG bundle will be dispersed in a frequency domain and mapped to a CCE. The number of rows of a block interleaver may be variably configured for a variety of frequency diversities.

In order for a terminal to receive a PDCCH, channel estimation using a PDCCH DMRS may be performed. A PDCCH may use one antenna port (e.g., antenna port index 2000). A PDCCH DMRS sequence is generated across the entire common resource block in a frequency domain, but it may be transmitted only in a resource block that an associated PDCCH is transmitted. Meanwhile, before a terminal obtains system information in an initial access process, a position of a common resource block may not be known, so for CORESET 0 configured by a MIB provided through a PBCH, a PDCCH DMRS sequence may be generated from a first resource block of CORESET 0. A PDCCH DMRS may be mapped to every fourth subcarrier in a REG. A terminal may perform channel estimation in a unit of a REG bundle by using a PDCCH DMRS.

Search Space (SS)

DCI in various formats or in various sizes may be used in PDCCH transmission and a terminal may perform blind detection or blind decoding for DCI by monitoring a PDCCH candidate based on a predetermined DCI format. A different DCI format may not necessarily have a different DCI size. Search space (SS) may be defined to limit the number of PDCCH candidates which should be monitored by a terminal.

Search space may be a set of control channel candidates corresponding to CCE(s) according to a predetermined aggregation level. For example, an aggregation level may be defined as 1, 2, 4, 8 or 16 and a PDCCH may be configured with a set of CCE(s) corresponding to an aggregation level. One or more CORESETs may be configured for a terminal and one or more search space may be configured for each CORESET. The number of PDCCH candidates may be configured per search space or per aggregation level.

Search space may include terminal-specific search space and common search space shared by multiple terminals. In terminal-specific search space, a terminal may try decoding of a PDCCH candidate based on a terminal-specific identifier (e.g., a C-RNTI). In common search space, a terminal may try decoding of a PDCCH candidate based on an identifier for a specific purpose (e.g., a SI (System Information)-RNTI, a P (Paging)-RNTI, a RA (Random Access)-RNTI, etc.), not a unique identifier. A CCE set for common search space may be predefined.

A terminal may try decoding of a PDCCH candidate for corresponding search space at a monitoring occasion (MO) configured for search space. In trying decoding of a PDCCH candidate, a terminal may process information transmitted through a PDCCH when it succeeds in CRC check based on an available RNTI, and it may ignore it by determining that it is information which is intended by other terminal or that an error exists when it fails in CRC check.

One search space (SS) may correspond to one monitoring occasion (MO) and one search space set (SS set) may correspond to a set of MOs. In addition, one SS set may define a time position that a CORESET associated with it exists (e.g., a period and/or an offset). In other words, a terminal may perform blind decoding for a PDCCH in a CORESET existing based on a period/an offset corresponding to a SS set. For example, MO 1 may exist repetitively in a period corresponding to SS set 1 and MO 2 may exist repetitively in a period corresponding to SS set 2. In addition, one CORESET may be associated with one or more (e.g., up to 10) SS sets, but one SS set may be associated only with one CORESET.

In addition, a CORESET is defined as a predetermined time-frequency resource in one time unit (e.g., a slot) and a space parameter (e.g., a TCI state, or a QCL RS) may be configured for each CORESET.

In addition, in relation to a blind decoding (BD) for a downlink control channel (e.g., PDCCH), an upper limit or a budget for at least one of the number of BDs or the number of CCEs (or the number of aggregated CCEs) in a predetermined time unit (e.g., one slot) may be configured. Such upper limit/budget may be related to the capability (e.g., processing speed) of the terminal. When the number of BD/CCE counted by the terminal within a predetermined time unit exceeds the upper limit, some SS set may be dropped. That is, the terminal may not attempt PDCCH monitoring/detection/blind decoding in the CORESET corresponding to the some SS set within the predetermined time unit.

Transmission/Reception Based on a Group of Time Units

The present disclosure includes examples of transmission and reception operations based on a group of existing time units (e.g., symbols, slots, etc.) (hereinafter, a group of time units) in a system supporting a subcarrier spacing (SCS) larger than the existing SCS.

For example, NR system currently defines an operation based on SCS (e.g., 15 kHz, 30 kHz, 60 kHz, 120 kHz) in a band of 52.6 GHz or less. For the future NR system (e.g., high frequency (HF)-NR) operating in a licensed and/or unlicensed band of 60 or 70 GHz frequency band (e.g., higher than 52.6 GHz to 71 GHz), it is being discussed to support operation in a higher frequency and wider bandwidth compared to the existing NR system. Considering the radio channel characteristics in the high frequency band, such as larger phase noise and larger Doppler shift, introduction and application of new OFDM numerology based on the SCS (e.g., 240 kHz, 480 kHz, 960 kHz, . . . ) larger than the existing NR SCS may be required.

As described with reference to FIG. 4, as the SCS in the frequency domain increases, the OFDM symbol length/duration in the time domain may be shortened. For example, in the case of 960 kHz SCS, the length of one OFDM symbol period including the CP may be approximately 1.1 μsec, and the length of one slot composed of 14 OFDM symbols may be approximately 15.6 μsec.

More specifically, in the existing NR system, the mmWave band (e.g., higher than 7.125 or 24 MHz, up to 52.6 GHz) is defined as FR2, and the SCS for the SS/PBCH block in the corresponding band may be either of 120 or 240 kHz, and the SCS for other signals/channels (e.g., PDCCH, PDSCH, PUSCH, etc.) may be either 60 or 120 kHz.

Assuming that the scalability of the OFDM symbol duration and CP length defined in the existing NR system is maintained for a SCS larger than the existing SCS, the OFDM symbol duration and CP length for each SCS may be applied as shown in Table 6.

TABLE 6

| SCS [kHz] | 120 | 240 | 480 | 960 |
| --- | --- | --- | --- | --- |
| Symbol duration | 8.33 μs | 4.17 μs | 2.08 μs | 1.04 μs |
| CP length | 586 ns | 293 ns | 146 ns | 73 ns |

In addition, in the existing NR system, a period of a search space (SS) set capable of configuring a monitoring occasion (MO) for a downlink control channel (e.g., PDCCH) is defined as at least one slot. As the length of a slot becomes shorter due to the introduction of a large SCS, a higher processing speed, higher power consumption, higher implementation complexity, or the like may be required for the terminal to monitor the downlink control channel for every slot.

In the present disclosure, in order to alleviate the burden of downlink control channel monitoring of the terminal in a system supporting a large SCS, a new transmission/reception operation based on a group of time units will be described. In addition, examples related to downlink control channel monitoring/decoding/reception and examples related to uplink/downlink transmission/reception related to timing of a downlink control channel, based on a transmission/reception operation based on a group of time units, will be described.

In the present disclosure, the values for the criteria for classifying frequency bands, SCS, and the length of time units are merely exemplary, and the scope of the present disclosure includes applying the following examples to a case in which a relatively large SCS compared to the existing SCS in any frequency band is applied, and accordingly, a relatively short time unit length is applied.

In the present disclosure, a plurality (i.e., M, where M is an integer greater than 1) of time units are defined as one group of time units.

For example, M time units may include contiguous or consecutive time units. Contiguous or consecutive time units include as case where, if there is other time domain element between the time units, target time units excluding the other time domain element are continuous, as well as a continuous case where there is no other time domain element between the time units. For example, if other time domain element exists between some time units, indexes are sequentially assigned only to target time units, and time units having continuous indexes may be referred to as contiguous/consecutive time units.

In the examples of the present disclosure, for clarity of explanation, it is described assuming that one time unit is one slot, and the group of time units is a slot group (i.e., a set of (contiguous/consecutive) M slots). However, the scope of the present disclosure is not limited to the case where one time unit is one slot, and the following examples may be applied to cases where one time unit is one symbol, a symbol group (or span), a mini slot, a subframe, a subframe group, a half frame, a frame, or the like.

As a representative example of the present disclosure, M slots may be defined as one slot group, and downlink control channel monitoring in a slot group unit (or based on a slot group) may be configured and performed. In the following example, it is assumed that the downlink control channel is a PDCCH, but examples of the present disclosure may be applied to other (or not yet defined) downlink channels to which the blind decoding method is applied.

In addition, a plurality of slot groups do not overlap each other and may be configured or defined as consecutive.

The M value may have a value of $2^n$ (where n is an integer greater than or equal to 1) to facilitate alignment with respect to different SCSs. For example, if M=8 is configured for active DL BWP operating at 960 kHz SCS, 8 slots of the active DL BWP are configured as one slot group, and the corresponding slot group may correspond to one slot in the case of 120 (=960/M) kHz SCS.

Alternatively, a reference SCS (ref-SCS) value may be configured. If the ref-SCS value is configured as 120 kHz for an active DL BWP operating with 960 kHz SCS, this may mean that 8 slots in the 960 kHz SCS corresponding to 1 slot based on 120 kHz SCS are configured as one slot group. In this case, it may be that $M=(2^{\mu\text{-}bwp}/2^{\mu\text{-}ref})$. Here, µ-ref represents the configuration index of ref-SCS (e.g., µ-ref=3 in case of 120 kHz SCS), and µ-bwp represents the SCS configuration index of an active DL BWP (e.g., µ-bwp=6 in case of 960 kHz SCS). Here, the relationship between u that is the SCS index and SCS is SCS=15*$2^\mu$ (see Table 1). For example, it may be defined in addition to the Table 1, µ=5 corresponds to 480 kHz SCS, and µ=6 corresponds to 960 kHz SCS.

The base station may provide configuration information for the slot group to the terminal. For example, the configuration information may include at least one of M, n(=log$_2$ M), ref-SCS, or ref-SCS configuration index. As described above, M is the number of slots included in one slot group, n is the number of powers of two corresponding to the number of slots, and ref-SCS may indirectly indicate the number of slots through the relationship with the SCS of the corresponding BWP. The terminal may recognize/determine the number of slots included in one slot group based on the configuration information.

Additionally or alternatively, information on the number of slots included in one slot group may be predefined for each SCS, given as a fixed value, or determined according to a capability value reported by the terminal to the base station, and the terminal may know the corresponding value without separate signaling from the base station.

Additionally or alternatively, information on the number of slots included in one slot group may be implicitly signaled to the terminal, from other signaling information (e.g., a period value of the SS set) from the base station.

In addition, a default M value to be assumed by the terminal may be defined before the M value is configured for an initial access terminal or an active DL BWP. Specifically, the default M value may be predefined as 1, or derived based on a specific ref-SCS (e.g., 120 kHz SCS). For example, the default M value may be derived by $(2^{\mu\text{-}bwp}/2^{\mu\text{-}ref})$. As a further example, a default M value may be defined/derived based only on the µ-bwp value. For example, the default M value may be defined/derived based on the µ-bwp value, regardless of ref-SCS (or without configuration/indication of ref-SCS, or assuming a fixed ref-SCS value). For example, if µ-bwp=5, the default M value may be 4, and if µ-bwp=6, the default M value may be 8.

In addition, for the same SCS, supportable M values may be different from each other according to the capability of each terminal. For example, if the terminal informs the base station that it can support the value M_1 as terminal capability information, the terminal may expect that the M value configured by the base station is greater than M_1. Additionally or alternatively, the terminal may expect that the minimum configuration unit (or unit size (granularity)) of the time domain characteristics (e.g., at least one of period, offset, or duration) of the SS set is configured as M_1 or higher, or a multiple of M_1.

In addition, the terminal may inform the base station that a plurality of M values can be supported for a specific serving cell (or DL BWP or SCS) as terminal capability information. The terminal may estimate/determine an M value to be actually applied among a plurality of M values based on a parameter for time domain characteristics of an SS set configured for a corresponding serving cell (or DL BWP or SCS). For example, it may be determined that the maximum M value smaller than the minimum among the period values of the SS set configured for the serving cell (or DL BWP or SCS) is the M value to be applied to the corresponding serving cell (or DL BWP or SCS). For example, a terminal reporting two values of M_1=4 and M_2=16 as capabilities for a specific DL BWP, if the minimum period value of the SS sets of the corresponding DL BWP is 8 slots, may know that the M value is 4 for the corresponding DL BWP. Accordingly, the terminal may perform PDCCH monitoring based on a slot group including 4 slots.

In the examples of the present disclosure, for clarity, following description is based on one value of M, n, ref-SCS, and ref-SCS configuration index, but for a case that the number of slots included in one slot group is determined based on another value, examples of the present disclosure may be analogously applied. DL BWP or active DL BWP described in the present disclosure may be replaced with terms such as a serving cell and a downlink carrier.

In the present disclosure, it may be applied to a system operating in a specific frequency range (e.g., an FR (e.g., 52.6 GHz to 71 GHz) distinct from existing FR1 and FR2), and/or DL BWP applied with a specific SCS (e.g., 120 kHz) or higher. In the following description, for clarity, the specific frequency range may be referred to as FR2-2 (in this case, the existing FR2 (i.e., 24250 MHz-52600 MHz) may be referred to as FR2-1) or FR3, and it may be assumed a case where FR2-2 or FR3 is applied. However, the scope of the present disclosure is not limited to the names FR2-2 or FR3, and may be understood to include examples in which the specific frequency range is applied or an SCS equal to or higher than the specific SCS is applied.

Examples of the present disclosure may be defined in integration with existing operations. For example, the operation may be defined based on N (i.e., the number of slots included in one slot group) regardless of the frequency range/SCS, and N=1 may be configured/defined for FR1/FR2 (and/or a specific SCS (e.g., 120 kHz) or lower), and N>1 may be configured/defined for FR3 (and/or higher than a specific SCS (e.g., 120 kHz)).

In the following examples, being configured with or given the M value may be interpreted as a case where N>1 (i.e., a case where one slot group includes a plurality of slots). Not being configured with or given the M value mat be interpreted as a case where N=1 (i.e., a case where the slot group is not configured).

FIG. 7 is a diagram for explaining a method of transmitting or receiving by a terminal based on a group of time units according to an embodiment of the present disclosure.

In step S710, the terminal may receive configuration information for a slot group from the base station.

The configuration information may include information on M (M is an integer greater than 1) which is the granularity of the slot group. For example, M may correspond to the number of slots included in one slot group. Here, one slot may have a length based on a specific SCS configured for a BWP/cell/carrier in which the terminal operates (e.g., performing PDCCH monitoring). Also, a slot group may be configured for at least one of an SCS higher than a predetermined SCS, or a predetermined frequency range. As an additional example, the configuration information may include at least one of an M value, an $n(=\log_2 M)$ value, or information on a ratio between a reference SCS and a specific SCS.

If the terminal performs monitoring of a downlink control channel (e.g., PDCCH) before receiving the configuration information for the slot group in S710, for the BWP/cell/carrier in which the terminal operates a default M value previously configured/defined (e.g., based on a specific SCS) may be applied.

In step S720, the terminal may monitor a downlink control channel in at least one search space (SS) set.

The time domain characteristics (e.g., at least one of period, offset, or duration) of the SS set may be configured based on M which is a granularity of the slot group. For example, at least one of the period or offset of the SS set may be configured to be greater than or equal to the M-slot length or a multiple of the M-slot length. For example, the duration of the SS set may be configured to be one of a value less than or equal to the M-slot length, a value less than or equal to a multiple of the M-slot length, or a value less than or equal to the product of the M value and the length of the period of the slot-based SS set.

Regarding SS set monitoring, at least one of the number of PDCCH candidates and/or the number of non-overlapping CCEs may be counted in each slot group (i.e., in units of slot groups). In addition, the maximum number of PDCCH candidates and/or the maximum number of non-overlapping CCEs (i.e. BD/CCE upper limit/budget) may be configured in each slot group (i.e., in units of slot groups). SS sets exceeding the BD/CCE upper limit/budget in each slot group may not be monitored or may be dropped. SS sets that are not monitored or dropped may be determined sequentially according to the order of indices of a plurality of SS sets.

When a plurality of cells are configured for the terminal (i.e., in case of carrier aggregation (CA)), the BD/CCE upper limit/budget may be distributed among the plurality of cells in units of slot groups. Also, for a primary cell (PCell) among a plurality of cells, whether to monitor or drop an SS set may be determined in each slot group. For example, whether to monitor or drop the SS set may be determined in the first N (N is an integer of 1 or greater) slots among the M slots included in the slot group.

In addition, if any one SS set is not included in one slot group (or if one SS set appears across multiple slot groups (e.g., consecutive slot groups)), the SS sets may not be monitored or may be dropped.

When a terminal reports capability information for a slot group granularity supported by the terminal to the base station, the M value configured by the base station may be configured as a value greater than or equal to the slot group granularity reported by the terminal. When a terminal has a plurality of supported slot group granularities and reports them to the base station as capability information, the M value may be determined based on the time domain characteristic value of the SS set.

In step S730, the terminal may receive downlink control information (DCI) on the downlink control channel.

When SS set group switching is triggered for the terminal, monitoring may be performed on the switched SS set group from the first slot group after a predetermined length of time (e.g., P symbols) from the timepoint of triggering. In addition, a timer related to the trigger of SS set group switching may decrease by 1 for each slot group.

In addition, a predetermined time interval indicated through DCI (e.g., a time interval between a downlink allocation DCI reception and a corresponding PDSCH reception, a time interval between a downlink data reception and a corresponding HARQ-ACK transmission, a time interval between uplink grant DCI reception and a corresponding PUSCH transmission, or the like) may be applied based on units of slot groups.

Figure 8:
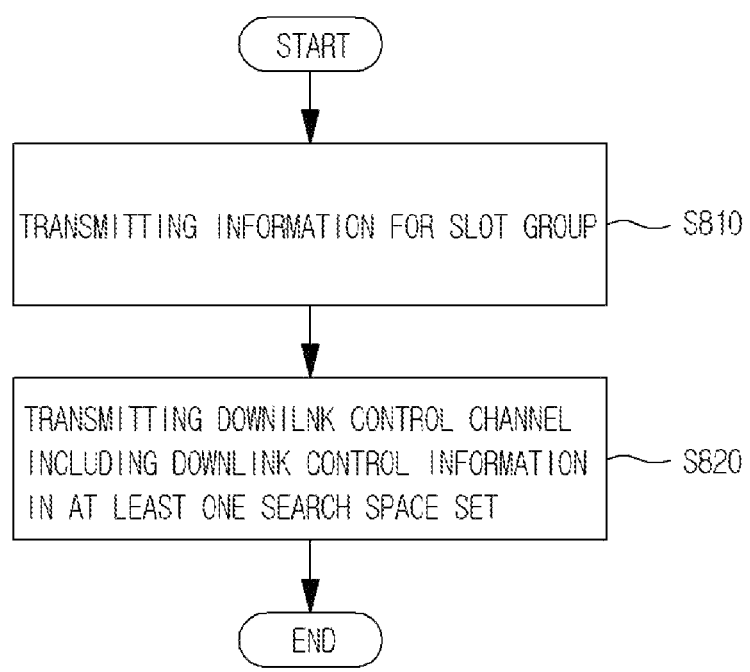
FIG. 8 is a diagram for explaining a method of transmitting or receiving by a base station based on a group of time units according to an embodiment of the present disclosure.

FIG. 8 is a diagram for explaining a method of transmitting or receiving by a base station based on a group of time units according to an embodiment of the present disclosure.

In step S810, the base station may transmit configuration information for the slot group to the terminal.

Description of the configuration information for the slot group is the same as that of step S710, a duplicate description is omitted.

Before the configuration information for the slot group is transmitted to the terminal, when the terminal performs SS set monitoring, the base station expects the terminal to operate based on a previously configured/defined default M value, or such restrictions may be applied to the base station.

In step S820, the base station may transmit a downlink control channel including downlink control information (DCI) to the terminal in at least one search space (SS) set.

When the base station configures the time domain characteristics (e.g., at least one of period, offset, or duration) of the SS set, restrictions for such configuration to be based on the slot group granularity M may be applied. For example, at least one of the period or offset of the SS set may be configured as a length greater than or equal to the M-slot length or a multiple of the M-slot length. For example, the duration of the SS set may be configured as one of a value less than or equal to the M-slot length, a value less than or equal to a multiple of the M-slot length, or a value less than or equal to the product of the M value and the length of the period of the slot-based SS set.

The base station may transmit a PDCCH in an SS set exceeding the maximum number of PDCCH candidates and/or the maximum number of non-overlapping CCEs (i.e., BD/CCE upper limit/budget) of the terminal, but the base station may expect that SS sets exceeding the BD/CCE upper limit/budget in each slot group, or an SS set not completely included in one slot group (or an SS set having period/duration across multiple slot groups) may not be monitored or may be dropped by the terminal, or such restrictions may be applied to the base station.

When a plurality of cells are configured for the terminal (i.e., in case of carrier aggregation (CA)), the base station may expect that the BD/CCE upper limit/budget is distributed among the plurality of cells in units of slot groups, or such restrictions may be applied to the base station. Also, for a primary cell (PCell) among a plurality of cells, the base station may expect that whether to monitor or drop an SS set is determined in each slot group, or such restrictions may be applied to the base station. For example, the base station may expect that whether to monitor or drop the SS set is determined in the first N (N is an integer of 1 or greater) slots among the M slots included in the slot group, or such restrictions may be applied to the base station.

When a terminal reports capability information for a slot group granularity supported by the terminal to the base station, restrictions for the base station to configure the M value to a value greater than or equal to the slot group granularity reported by the terminal may be applied. When a terminal has a plurality of supported slot group granularities and reports them to the base station as capability information, the M value may not be explicitly signaled by the base station, but may be implicitly indicated to the terminal based on the time domain characteristic value of the SS set.

When SS set group switching is triggered for the terminal, the base station may expect that the terminal performs monitoring on the switched SS set group from the first slot group after a predetermined length of time (e.g., P symbols) from the timepoint of triggering, or such restrictions may be applied to the base station. In addition, the base station may expect that a timer related to the trigger of SS set group switching decreases by 1 for each slot group, or such restrictions may be applied to the base station.

In addition, the base station may expect that a predetermined time interval indicated through DCI (e.g., a time interval between a downlink allocation DCI reception and a corresponding PDSCH reception, a time interval between a downlink data reception and a corresponding HARQ-ACK transmission, a time interval between uplink grant DCI reception and a corresponding PUSCH transmission, or the like) is applied based on units of slot groups, or such restrictions may be applied to the base station.

Hereinafter, specific examples of the present disclosure for transmission or reception based on a group of time units will be described.

Embodiment 1

The present embodiment relates to, based on the configuration of the number (M) of slots included in one slot group, an example that the time domain characteristic of the SS set is configured based on a granularity of the slot group (hereinafter referred to as "M-slot"). That is, M-slot may mean a time length corresponding to M slots.

For example, for an active DL BWP for which a value M is configured/given, the period and/or offset value of the SS set may be configured to be greater than or equal to M-slot or a multiple of M-slot. Additionally or alternatively, for the active DL BWP for which the M value is configured, the duration value of the SS set may be configured to be less than or equal to M-slot, less than or equal to a multiple of M-slot, or less than or equal to period of the SS set*M. Here, the duration of the SS set being configured to be less than or equal to the period of the SS set*M may correspond to a case that the period of the SS set is signaled in slot-based granularity (as in the existing scheme) and the duration of the SS set is signaled as a value less than or equal to the period, and the period of the SS set is applied as the signaled period*M and the duration of the SS set is applied as the signaled duration*M according to the interpretation of the terminal.

Alternatively, the period of SS set may be configured as a shorter length than M-slot. In addition, the duration of the SS set may be configured as a shorter length than the period of the SS set.

For example, the period and/or offset value of the SS set may be configured based on a higher layer signaling parameter monitoringSlotPeriodAndOffset. The duration of the SS set may be configured based on a higher layer signaling parameter duration, and the duration value of the SS set may be configured as a value equal to or less than the period of the SS set.

As such, information on a time domain occasion (or monitoring occasion) for PDCCH monitoring, such as a period, offset, and duration of the SS set, may be configured in the SS set configuration. According to the present disclosure, when a slot group including a plurality of slots is configured (or M value is configured), configuration of the time domain characteristics of the SS set may be configured based on M-slot granularity instead of the existing slot granularity. Accordingly, sufficient time for the terminal to perform monitoring and processing of PDCCH may be secured, so that advantageous effects such as power consumption reduction and implementation complexity simplification may be achieved.

For example, in the existing SS set configuration, the period may be defined as ks slots. If the value of M may be configured (for example, if FR3 is supported), a parameter called ks' instead of ks may be defined, it may be defined that ks'=ks for FR1 and FR2, and ks'=ks*M for FR3. Alternatively, it may be defined as ks slot groups (i.e., ks M-slots) instead of ks slots may be defined.

Figure 9:
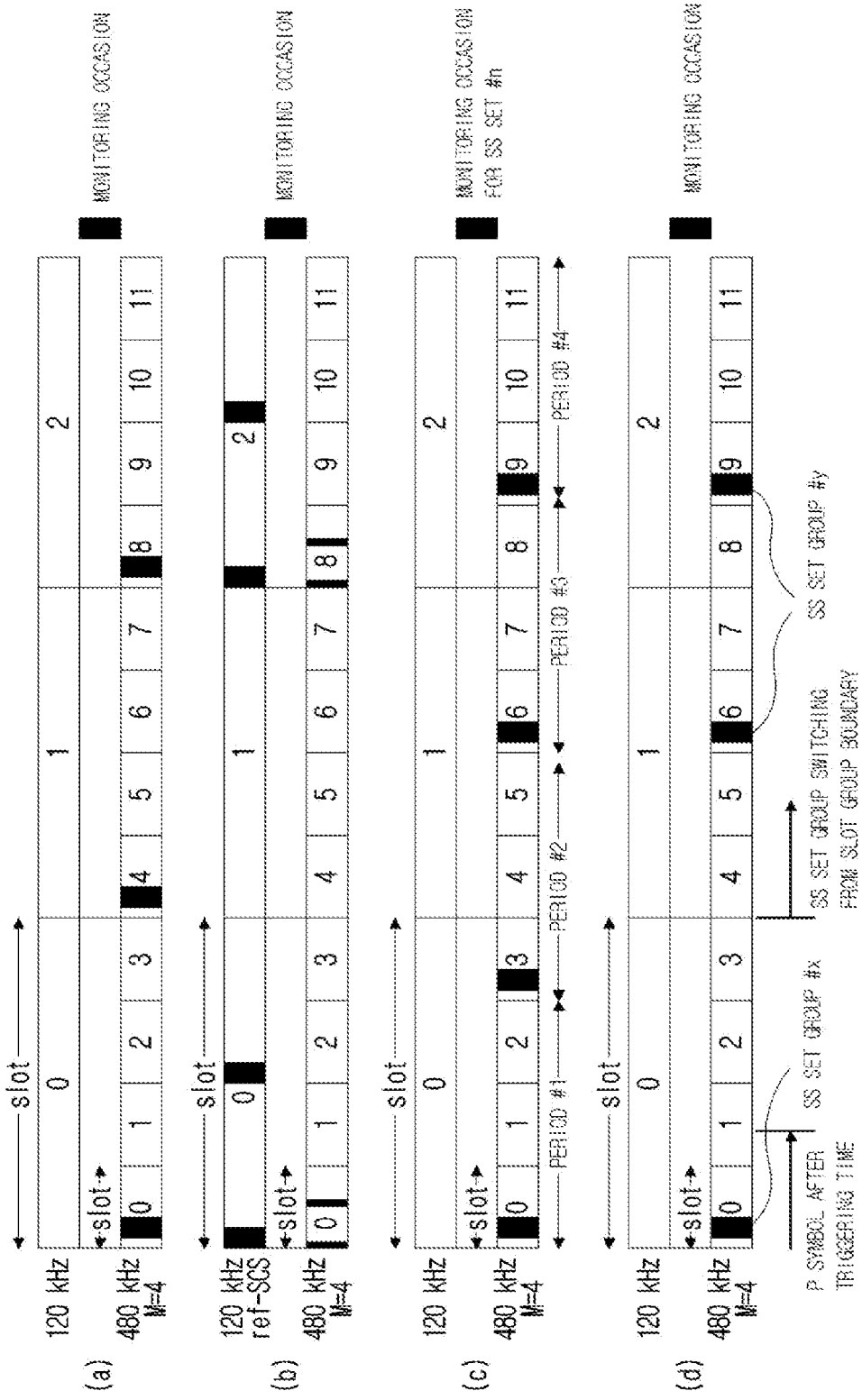
FIG. 9 is a diagram illustrating a downlink control channel monitoring opportunity based on a group of time units according to an embodiment of the present disclosure.

FIG. 9 is a diagram illustrating a downlink control channel monitoring opportunity based on a group of time units according to an embodiment of the present disclosure.

In the example of FIG. 9(a), it illustrates a case in which the M value is configured as 4 for the active DL BWP operating in 480 kHz SCS. In this case, the period of the SS set may be configured as 4-slot (or slots of multiple of 4). Therefore, PDCCH monitoring may be performed every 4 slots instead of every slot.

As an additional example, the time domain characteristics (e.g., at least one of period, offset, or duration) of the SS set when the M value is configured may be interpreted assuming a case of ref-SCS. For example, if the monitoring occasion (MO) exists in the n-th slot or slot index #n (hereinafter referred to as slot #n) assuming the case of ref-SCS, it may be interpreted that, among slots #m, #m+1, #m+2, . . . of a target SCS (e.g., SCS greater than ref-SCS) facing or corresponding to slot #n of ref-SCS, MO of the target SCS is present in a specific slot (e.g., an earliest slot).

Referring to FIG. 9(b), it is assumed that ref-SCS is configured as 120 kHz for active DL BWP operating with 480 kHz SCS. For example, in SS set configuration based on ref-SCS, it may be configured as period=2 slots, offset=0, duration=1 slot, and CORESET position in symbol #0/#7 in the slot. In this case, the terminal may assume that corresponding SS sets are configured in slot #0 and slot #2 based on 120 kHz SCS. It may be seen that, among slots #0, #1, #2, and #3 based on 480 kHz SCS which face slot #0 based on the ref-SCS of 120 kHz SCS, MO presents in symbol #0/#7 in the earliest slot #0. Also, it may be seen that, among slots #8, #9, #10, and #11 based on 480 kHz SCS which face slot #2 based on the ref-SCS of 120 kHz SCS, MO presents in symbol #0/#7 in the earliest slot #8.

Embodiment 2

The present embodiment relates to a method of applying a BD/CCE count related to PDCCH monitoring and an upper limit/budget thereto in units of slot groups (i.e., M-slots).

For example, in calculating the maximum number of PDCCH candidates and/or the maximum number of non-overlapped CCEs for DL BWP, it may be reported/determined in units of M-slots.

When a slot group is not applied (i.e., when M value is not configured as in the existing scheme), the maximum number of PDCCH candidates monitored per serving cell and per slot may be defined based on the SCS configuration index $\mu$. For example, for $\mu=0$, 1, 2, and 3, the maximum number of PDCCH candidates ($M_{PDCCH}^{max,slot,\mu}$) may be defined as 44, 36, 22, and 20, respectively.

In addition, when the slot group is not applied (i.e., when the M value is not configured as in the existing scheme), the maximum number of non-overlapping CCEs per serving cell and per slot may be defined based on the SCS configuration index $\mu$. For example, for $\mu=0$, 1, 2, and 3, the maximum number of CCEs ($C_{PDCCH}^{max,slot,\mu}$) may be defined as 56, 56, 48, and 32, respectively.

For a DL BWP to which a slot group is applied (i.e., M value is configured), PDCCH monitoring may be performed in a period based on a slot group (i.e., M-slot) unit instead of a slot unit. Accordingly, the maximum number of PDCCH candidates and/or the maximum number of non-overlapping CCEs for the corresponding DL BWP may be defined in units of slot groups.

For example, for a DL BWP configured with the SCS configuration index $\mu\_1$, if an SCS configuration index corresponding to the M value (or corresponding to ref-SCS) is $\mu\_2$ (i.e., $2^{\mu-1}/2^{\mu-2}=M$), the maximum number of PDCCH candidates and the maximum number of non-overlapping CCEs defined for the configuration index $\mu\_2$ may be applied in units of slot groups to the corresponding DL BWP.

For example, as shown in Table 7, the maximum number of PDCCH candidates monitored per serving cell and per slot ($M_{PDCCH}^{max,slot,\mu}$) may be predefined.

TABLE 7

| $\mu$ | maximum number of PDCCH candidates monitored per serving cell and per slot |
|---|---|
| 0 | 44 |
| 1 | 36 |
| 2 | 22 |
| 3 | 20 |

TABLE 7-continued

| $\mu$ | maximum number of PDCCH candidates monitored per serving cell and per slot |
|---|---|
| 4 | P1 |
| 5 | P2 |
| 6 | P3 |
| ... | ... |

When M=4 is configured for DL BWP operating in 480 kHz SCS (i.e., $\mu=5$), the maximum number of PDCCH candidates monitored "per slot group" including 4 slots may be 20. Specifically, regardless of the P2 value of Table 7 (i.e., the maximum number of PDCCH candidates "per slot"), it may be determined that 20 which is the maximum number of PDCCH candidates "per slot" defined based on 480/M=480/4=120 kHz SCS (i.e., $\mu=3$) is the maximum number of PDCCH candidates "per slot group" based on 480 kHz SCS (i.e. $\mu=5$).

Embodiment 2-1

A case in which carrier aggregation (CA) is configured for a terminal will be described.

When CA of a plurality of DL cells is configured for the terminal, in a case that a predetermined condition is satisfied, the maximum number of PDCCH candidates and the maximum number of non-overlapping CCEs may be distributed based on the SCS of the DL BWP in each serving cell.

For example, the predetermined condition may be expressed as Equation 3.

$$\sum_{\mu=0}^{3} N_{cells}^{DL,\mu} > N_{cells}^{cap} \quad \text{[Equation 3]}$$

In Equation 3, $N_{cells}^{DL,\mu}$ corresponds to the number of DL cells for which the SCS configuration index $\mu$ is configured. $N_{cells}^{cap}$ may be configured as the BD/CCE capability value of the terminal.

When the condition of Equation 3 is satisfied, the terminal may not monitor (or may drop) a PDCCH candidate exceeding the value of Equation 4 or a non-overlapping CCE exceeding the value of Equation 5 per slot.

$$M_{PDCCH}^{total,slot,\mu} = \left\lfloor N_{cells}^{cap} \cdot M_{PDCCH}^{max,slot,\mu} \cdot N_{cells}^{DL,\mu} / \sum_{j=0}^{3} N_{cells}^{DL,j} \right\rfloor \quad \text{[Equation 4]}$$

$$C_{PDCCH}^{total,slot,\mu} = \left\lfloor N_{cells}^{cap} \cdot C_{PDCCH}^{max,slot,\mu} \cdot N_{cells}^{DL,\mu} / \sum_{j=0}^{3} N_{cells}^{DL,j} \right\rfloor \quad \text{[Equation 5]}$$

In Equations 4 and 5, $M_{PDCCH}^{total,slot,\mu}$ is the number of PDCCH candidates that can be monitored, and $C_{PDCCH}^{total,slot,\mu}$ is the number of non-overlapping CCEs that can be monitored.

In Equations 3 to 5, it is assumed that the SCS configuration index $\mu$ is 0 to 3, but the scope of the present disclosure includes the case where the SCS configuration index $\mu$ is 4 or higher (see Table 7).

As described above, for the DL BWP configured as the SCS configuration index $\mu\_1$, if a configuration index of the SCS corresponding to the M value (or corresponding to the ref-SCS) is $\mu\_2$ (i.e., $2^{\mu-1}/2^{\mu-2}=M$), the maximum number of PDCCH candidates and the maximum number of non-overlapping CCEs defined for the SCS configuration index μ_2 may be applied in units of slot groups to the corresponding DL BWP.

Here, in Equations 4 and 5 for distributing the maximum number of PDCCH candidates and/or the maximum number of non-overlapping CCEs, the value of j in $N_{cells}^{DL,j}$ may be applied as a value corresponding to μ_2, not μ_1. That is, when the M value is configured for the terminal, it may be assumed not the SCS value of the DL BWP to which the M value is applied, but the SCS value in which one slot having a length corresponding to one slot group is configured. In other words, since the distribution according to Equations 4 and 5 is based on the maximum number of PDCCH candidates and/or the number of non-overlapping CCEs "per slot," Equation 4 and 5 may be applied based on the SCS having the slot corresponding to the "slot group."

For example, if the SCS value of the DL BWP to which the M value is applied is 480 kHz (i.e., μ_1=5) and M=4, based on an SCS value of 120 kHz (i.e., μ_2=3) which configures a slot having a length corresponding to one slot group (i.e. 4-slot), the distribution equations of Equations 4 and 5 may be applied (i.e., the value of j in $N_{cells}^{DL,j}$ in Equations 4 and 5 is not 5 but 3). That is, it may be expressed as j=μ_2=μ_1−log₂ M.

Embodiment 2-2

In case that the number of PDCCH candidates (and/or the number of non-overlapping CCEs) per slot for the primary cell (PCell) exceeds the maximum number of allowed PDCCH candidates (and/or the maximum number of non-overlapping CCEs), the terminal may drop a specific SS set in the corresponding slot and may not monitor it.

Such an SS set drop may be applied for each slot group corresponding to the M-slot for a DL BWP to which an M value is given.

Additionally or alternatively, the SS set drop may be applied per slot for a DL BWP given a value M, and in this case, SS set drop may be performed only for the first N slots in a slot group (e.g., the N value may be predefined or signaled by a base station, for example, N-2). In other words, the terminal may expect that, in slot(s) other than the first N slots in the slot group, the number of PDCCH candidates (and/or the number of non-overlapping CCEs) does not exceeds the allowed maximum number of PDCCH candidates (and/or the maximum number of non-overlapping CCEs). Accordingly, the terminal may not determine (or the terminal may skip determining), for slots other than the first N slots in the slot group (and/or the number of non-overlapping CCEs), whether the number of PDCCH candidates (and/or the number of non-overlapping CCEs) exceeds the allowed maximum number of PDCCH candidates (and/or the maximum number of non-overlapping CCEs).

When a plurality of SS sets exist in one slot group, SS sets to be dropped may be determined sequentially according to the order of indices of the plurality of SS sets.

Embodiment 3

The present embodiment an example relates to the PDCCH monitoring operation for a case that the period and/or duration of the SS set is not included in one slot group (i.e., M-slot) (or one SS set exists across a plurality of (consecutive) slot groups).

For example, for an active DL BWP to which a value M is configured, a period and/or duration corresponding to a specific SS set may not be included in one slot group (i.e., M-slot). For example, when the SS set is repeated according to a configured period, the n-th SS set period and/or the n-th SS set duration are not included in one slot group (i.e., M-slot), and across a plurality of (adjacent) slot groups (i.e., M-slots). Here, the SS set monitoring may not be performed (e.g., monitoring off) during a specific interval (e.g., SS set period/duration) that is not completely included in one slot group (i.e., M-slot), and if SS set drop is required due to exceeding BD/CCE upper limit/budget, a specific interval not included in one slot group (i.e., M-slot) among the corresponding SS set may be dropped first.

Referring to FIG. 9(*c*), when the active DL BWP with M=4 is configured with 480 kHz SCS, a period of 3 slots may be configured for the SS set. MOs corresponding to period #1 and period #4 included in one slot group including of 4-slots may be considered valid, and MOs (e.g., slots #3 and #6) corresponding to period #2 and period #3 not included in one slot group may be considered invalid. In invalid MO(s), PDCCH monitoring of the terminal may not be required or the terminal may omit/skip PDCCH monitoring.

As an additional example, in performing SS set drop based on the maximum number of PDCCH candidates and/or the maximum number of non-overlapping CCEs per slot group (i.e., M-slot), it may be assumed that SS set #n needs to be dropped for a specific slot group (i.e., a first slot group corresponding to slots #0, #1, #2, and #3). In this case, instead of dropping the entire SS set #n, if an SS set corresponding to period #2 that is not included in one slot group (e.g., a first slot group corresponding to slots #0, #1, #2, and #3, or a second slot group corresponding to slots #4, #5, #6, and #7) is dropped first, it may be determined whether conditions for the maximum number of PDCCH candidates and/or the maximum number of non-overlapping CCEs are satisfied. If satisfied, the SS set corresponding to period #2 may be dropped first, and PDCCH monitoring corresponding to period #1 may be performed. If not satisfied, whether to drop the SS set corresponding to period #1 included in one slot group may be additionally determined.

As an additional example, in performing SS set drop based on the maximum number of PDCCH candidates and/or the maximum number of non-overlapping CCEs per slot group (i.e., M-slot), it may be counted except for the number of PDCCH candidates and the number of CCEs of the SS set corresponding to period #2 and/or period #3 not included in one slot group.

As described above, the BD/CCE upper limit/budget calculation of the terminal may be applied in units of slot groups, and the time domain characteristics such as period/offset/duration of the PDCCH MO/SS set may be configured differently from the granularity of one slot group. For example, the time domain characteristics of the SS set may be configured to be smaller than M-slot, equal to or larger than M-slot, or multiple of M-slot.

Embodiment 4

The present embodiment relates to a method of performing SS set group switching based on a slot group.

For example, it is assumed that an SS set group (i.e., a group including at least one SS set) is configured for an active DL BWP to which a value M is configured, and SS set group switching is performed. In this case, the timing at which monitoring of group index #x is stopped and monitoring of group index #y is started may be determined based on a slot group granularity boundary (i.e., a boundary between M-slots).

As an additional example, the value of a timer related to SS set group switching (e.g., a timer configured based on the searchSpaceSwitchingTimer parameter) may be decreased by 1 per slot group granularity (e.g., M-slot).

For example, when the M value is not configured (i.e., the slot group is not configured), the terminal may start PDCCH monitoring in the SS set(s) corresponding to the switched group index, from the first "slot" after at least a predetermined number (e.g., P_switch) of symbol(s) from the time point when SS set group switching is triggered.

The time point at which SS set group switching is triggered is, for example, a time point at which an SS set switching flag is indicated by DCI format 2_0, a predetermined timer value expires, receiving DCI in SS set configured with group index 0, the remaining channel occupancy duration indicated by DCI format 2_0 ends, or the like.

When a value M is configured for a DL BWP in which SS set group indexes are configured, from the first "slot group" after at least P_switch number symbol(s) from the time point when SS set group switching is triggered, PDCCH monitoring may be started in SS set(s) corresponding to the switched group index.

Referring to FIG. 9(d), it is illustrated a case that a time point corresponding to P symbols after the time point when SS set group switching is triggered is slot #1 based on 480 kHz SCS. In this case, PDCCH monitoring is performed in the SS set(s) corresponding to the group index before switching (i.e., SS set group #x) up to a specific symbol position in slot #1, and from the specific symbol position in slot #1, SS set monitoring may be stopped. In addition, PDCCH monitoring may be performed in SS set(s) corresponding to the switched group index (i.e., SS set group #y) from slot #4, corresponding to the boundary of the first "slot group" after slot #1.

Embodiment 5

The present disclosure relates to a method of applying a predetermined time interval starting from a PDCCH/DCI based on units of slot groups.

For example, the predetermined time interval may be defined as a time interval from slot A to slot B. The predetermined time interval may include K0, K1, K2, etc. as shown in Table 8. The scope of the present disclosure is not limited to the examples of time intervals in Table 8, and includes application to time intervals related to transmission/reception timing dynamically indicated by DCI for DL BWP for which M value is configured.

TABLE 8

| | slot A | Slot B |
|---|---|---|
| K0 | Receiving DCI scheduling DL data (e.g., PDSCH) | Receiving DL data scheduled by DCI |
| K1 | Receiving DL data (e.g., PDSCH) | Transmitting HARQ-ACK corresponding to DL data |
| K2 | Receiving DCI scheduling UL data (e.g., PUSCH) | Transmitting UL data scheduled by DCI |

For example, for an active DL/UL BWP to which an M value is configured, the terminal may apply K0/K1/K2 value in units of slot groups.

For example, if the K0 value indicated in the DCI received in slot #n is n1, the terminal may expect PDSCH reception to start in slot #n+M*n1.

For example, if the K1 value indicated in the DCI received in slot #n is n2, the terminal may transmit HARQ-ACK PUCCH (in the corresponding UL BWP) after M*n2 slots from the last slot in which the PDSCH is received.

For example, if the value of K2 indicated in the DCI received in slot #n is n3, the terminal may start PUSCH transmission in slot #n+M*n3.

As a more specific example, the base station may configure with a terminal a set of X (X is an integer greater than or equal to 1) K0 values (i.e., {first K0 value, second K0 value, third K0 value, . . . , X-th K0 value}) through a higher layer signaling (e.g., terminal-specific RRC signaling). Then, the base station may indicate any one among the set X K0 values through DL allocation (i.e., DL data scheduling) DCI. The terminal may perform DL data (e.g., PDSCH) reception based on the K0 value indicated through the DCI.

In addition, the base station may configure with a terminal a set of Y (Y is an integer greater than or equal to 1) K1 values (that is, {first K1 value, second K1 value, third K1 value, . . . , Y-th K1 value}) through a higher layer signaling (e.g., terminal-specific RRC signaling). Then, the base station may indicate any one among the set Y K1 values through DL allocation DCI. The terminal may perform HARQ-ACK (e.g., PUCCH) transmission for DL data based on the K1 value indicated through the DL allocation DCI.

In addition, the base station may configure with a terminal a set of Z (Z is an integer greater than or equal to 1) K2 values (that is, {first K2 value, second K2 value, third K2 value, . . . , Z-th K2 value}) through a higher layer signaling (e.g., terminal-specific RRC signaling). Then, the base station may indicate any one among the set Z K2 values through UL grant (i.e., UL data scheduling) DCI. The terminal may perform UL data (e.g., PUSCH) transmission based on the K2 value indicated through the UL grant DCI.

Here, for the active DL/UL BWP to which the M value is configured, K0/K1/K2 value may be applied in units of slot groups (i.e., M-slots). For active DL/UL BWP to which M value is not configured, K0/K1/K2 value may be applied in units of slots.

If the SCSs of slot A and slot B in Table 8 are different (that is, slot A and slot B belong to cells in which different SCSs are configured), K0/K1/K2 value may be defined based on the SCS of slot B. In addition, whether M value is configured for active DL/UL BWP may be determined based on the cell to which slot B belongs.

As an additional example, before the terminal receives information on the set of K0/K1/K2 candidate(s) through RRC signaling, at least one of a predefined default K0 value, default K1 value, or default K2 value may be applied. When transmitting or receiving is performed in DL/UL BWP where the M value is configured (or when operating based on an SCS larger than a predetermined SCS, or operating in FR3), a terminal may apply the default K0/K1/K2 value in units of slot groups based on the above-described default M value. When transmitting or receiving is performed in DL/UL BWP where M value is not configured (or when operating based on an SCS less than or equal to a predetermined SCS, or operating in FR1/FR2), the terminal may apply default K0/K1/K2 value in units of slots.

As an additional example, depending on whether the M value is configured (or when operating based on an SCS less than or equal to/larger than a predetermined SCS, or when operating in FR1/FR2 or FR3), a terminal may apply a predetermined time offset value in units of slot groups or in units of slots. For example, the predetermined time offset value may include a minimum scheduling offset (e.g., a time offset based on minimumSchedulingOffsetK0 and/or minimumSchedulingOffsetK2 parameters) introduced to minimize unnecessary power consumption of the terminal. For example, when the minimumSchedulingOffsetK0 value is configured as a value of Q, the terminal may apply Q slots as offset values in the DL/UL BWP where the M value is not configured, and apply Q*M slots (i.e., Q slot groups) as an offset value in the DL/UL BWP where the M value is configured.

Figure 10:
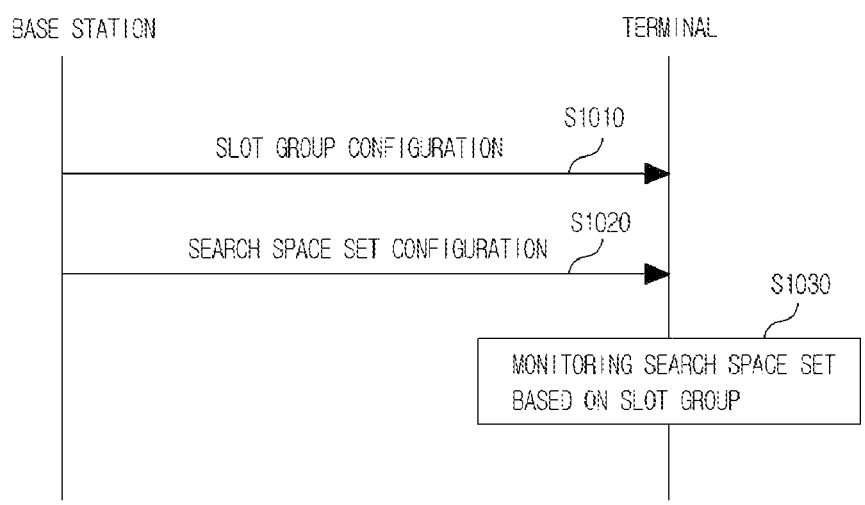
FIG. 10 is a diagram for illustrating a signaling procedure of a base station and a terminal according to an embodiment of the present disclosure.

FIG. 10 is a diagram for illustrating a signaling procedure of a base station and a terminal according to an embodiment of the present disclosure.

In step S1010, the base station may provide configuration of a slot group to the terminal. For example, the base station may configure an M value for a DL BWP operating based on a specific SCS. For example, the slot group configuration may include activating the DL BWP with the SCS corresponding to the configuration index of $\mu\_1$ (e.g., SCS higher than 120 kHz) (for example, $\mu\_1=5$ for 480 kHz SCS), and configuring the M value as m (e.g., 4).

In step S1020, the base station may provide configuration for the SS set to the terminal. For example, the period of the SS set configured in the DL BWP based on a specific SCS may be configured as M-slot or larger, or a multiple of M-slot. For example, when M=m is configured, the period of the SS set may be configured as m*x (x is an integer greater than or equal to 1), and parameters for time domain characteristics of the SS set, such as offset and duration, may be additionally configured.

In step S1030, the terminal may perform SS set monitoring based on the slot group. For example, the maximum number of PDCCH candidates and/or the maximum number of non-overlapping CCEs (i.e., BD/CCE upper limit/budget) may be determined for each M-slot, SS sets exceeding the BD/CCE upper limit/budget may not be monitored or may be dropped for each M-slot. For example, when M=m is configured, the terminal may apply the maximum number of PDCCH candidates and/or the maximum number of non-overlapping CCEs per m-slot, and whether the SS set being monitored/dropped may be determined based on whether the number of PDCCH candidates and/or non-overlapping CCEs per m-slot exceeding the maximum number.

A combination of one or more of the above-described embodiments 1 to 5 may be applied to the example of FIG. 10, and redundant descriptions are omitted.

As described above, unlike the existing frequency range/existing SCS in which the SS set period capable of configuring the PDCCH MO is configured as at least 1 slot, in case of PDCCH monitoring performed in every slot even in a system supporting a new frequency range/new SCS (e.g., an SCS larger than the existing SCS), power consumption of the terminal may increase or implementation complexity may increase. Therefore, by defining/configuring M (M is an integer greater than 1) slots as slot groups according to various examples of the present disclosure, configuration and performing PDCCH monitoring in units of slot groups may be supported, thereby reducing power consumption of the terminal. and reduce implementation complexity.

General Device to which the Present Disclosure May be Applied

Figure 11:
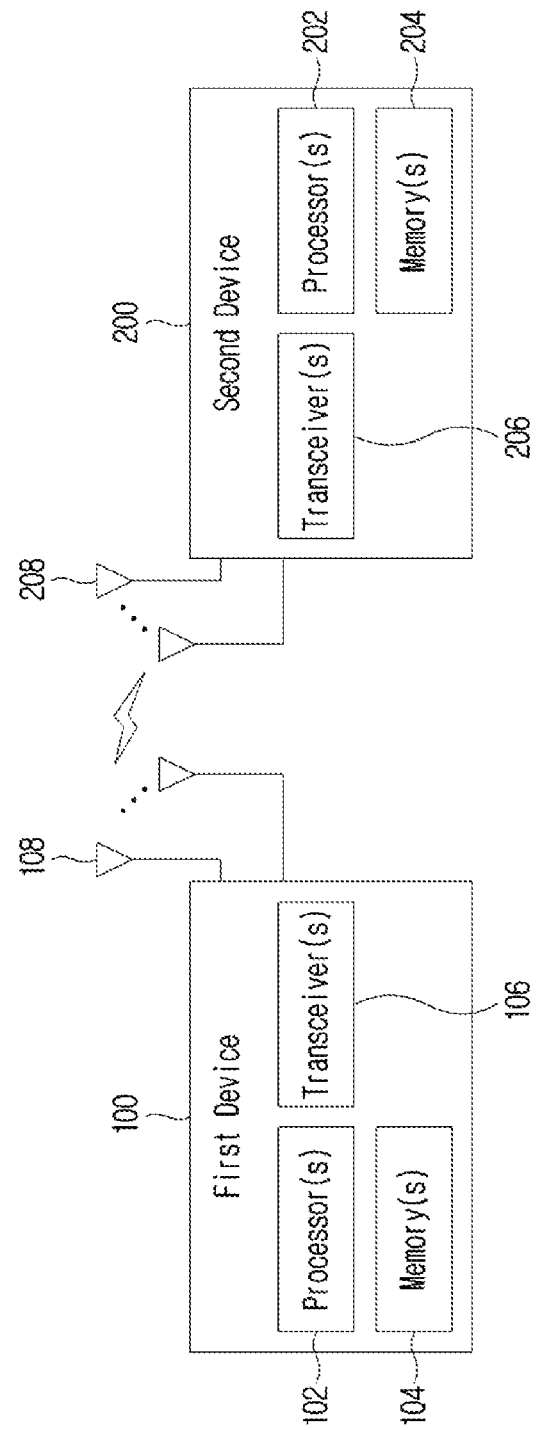
FIG. 11 illustrates a block diagram of a wireless communication system according to an embodiment of the present disclosure.

FIG. 11 is a diagram which illustrates a block diagram of a wireless communication system according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a terminal in a wireless communication system, the method comprising:

receiving at least one physical downlink control channel (PDCCH) candidate on an active downlink bandwidth part on a serving cell according to at least one search space (SS) set for maximum numbers of PDCCH candidates and non-overlapping control channel elements (CCEs) per a group of M slots; and decoding the at least one PDCCH candidate according to monitored downlink control information (DCI) format, wherein M is a number of consecutive slots, wherein multiple groups of M slots are consecutive and non-overlapping, wherein, based on the terminal not being provided configuration information for monitoring capability for the serving cell, a pre-defined value of M is applied for a specific subcarrier spacing (SCS) configuration.

2. The method according to claim 1, wherein:

for SCS configuration index 5, the pre-defined value of M is 4, and for SCS configuration index 6, the pre-defined value of M is 8.

3. The method according to claim 1, wherein:

based on the terminal being provided the configuration information for monitoring capability for the serving cell, the terminal obtains an indication to monitor PDCCH on the serving cell for maximum numbers of PDCCH candidates and non-overlapping CCEs per the group of M slots based on the configuration information for monitoring capability.

4. The method according to claim 1, wherein:

for SCS configuration index 5 or 6, a capability to monitor PDCCH related to the group of M slots is indicated by the terminal.

5. The method according to claim 1, wherein:

for SCS configuration index 5, based on a value of M being 4, the maximum number of monitored PDCCH candidates per a group of M slots is 20, and the maximum number of non-overlapped CCEs in a group of M slots is 32, and for SCS configuration index 6, based on a value of M being 8, the maximum number of monitored PDCCH candidates per a group of M slots is 20, and the maximum number of non-overlapped CCEs in a group of M slots is 32.

6. The method according to claim 1, wherein:

at least one of a period, offset, or duration of the at least one SS set is based on a value of M.

7. The method according to claim 6, wherein:

at least one of the period or the offset of the at least one SS set corresponds to an integer multiple of M slots, the duration of the at least one SS set corresponds to be equal to or less than the period that is the integer multiple of M slots.

8. The method according to claim 6, wherein:

the at least one SS set is determined, according to an order of SS set index, based on a number of counted PDCCH candidates not exceeding a maximum number of monitored PDCCH candidates per a group of M slots, and based on a counted number of non-overlapping CCEs not exceeding a maximum number of non-overlapping CCEs in a group of M slots.

9. The method according to claim 6, wherein:

based on SS set group switching being triggered for the terminal, monitoring of switched SS set group is started at a beginning of a first slot of group of M slots that is a predetermined time length after a time point of triggering.

10. A terminal in a wireless communication system, the terminal comprising:
- at least one transceiver; and
- at least one processor connected to the at least one transceiver,
- wherein the at least one processor is configured to:
  - receive, through the at least one transceiver, at least one physical downlink control channel (PDCCH) candidate on an active downlink bandwidth part on a serving cell according to at least one search space (SS) set for maximum numbers of PDCCH candidates and non-overlapping control channel elements (CCEs) per a group of M slots; and
  - decode the at least one PDCCH candidate according to monitored downlink control information (DCI) format,
- wherein M is a number of consecutive slots,
- wherein multiple groups of M slots are consecutive and non-overlapping,
- wherein, based on the terminal not being provided configuration information for monitoring capability for the serving cell, a pre-defined value of M is applied for a specific subcarrier spacing (SCS) configuration.

11. A base station in a wireless communication system, the terminal comprising:
- at least one transceiver; and
- at least one processor connected to the at least one transceiver,
- wherein the at least one processor is configured to:
  - code a downlink control information (DCI) according to a DCI format; and
  - transmit, to a terminal through the at least one transceiver, the DCI via a physical downlink control channel (PDCCH), the PDCCH corresponding to one of at least one PDCCH candidate received by the terminal on an active downlink bandwidth part on a serving cell according to at least one search space (SS) set for maximum numbers of PDCCH candidates and non-overlapping control channel elements (CCEs) per a group of M slots,
- wherein M is a number of consecutive slots,
- wherein multiple groups of M slots are consecutive and non-overlapping,
- wherein, based on the terminal not being provided configuration information for monitoring capability for the serving cell, a pre-defined value of M is applied for a specific subcarrier spacing (SCS) configuration.

* * * * *